US011488100B2

(12) United States Patent
Helvie et al.

(10) Patent No.: US 11,488,100 B2
(45) Date of Patent: Nov. 1, 2022

(54) LOAD TRACKING COMPUTING PLATFORM AND USER INTERFACE

(71) Applicant: Target Brands, Inc., Minneapolis, MN (US)

(72) Inventors: Eric Christopher Helvie, Eagan, MN (US); Adam Lee Hollenbeck, Blaine, MN (US); Justine Rockers, Minneapolis, MN (US); Thomas Young, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/696,632

(22) Filed: Nov. 26, 2019

(65) Prior Publication Data
US 2021/0158276 A1 May 27, 2021

(51) Int. Cl.
*G06Q 10/08* (2012.01)
*G06Q 10/06* (2012.01)
*G06Q 30/02* (2012.01)

(52) U.S. Cl.
CPC .......... *G06Q 10/087* (2013.01); *G06Q 10/06* (2013.01); *G06Q 10/0832* (2013.01); *G06Q 10/0833* (2013.01); *G06Q 30/02* (2013.01)

(58) Field of Classification Search
CPC .. G06Q 10/087; G06Q 10/06; G06Q 10/0832; G06Q 10/0833; G06Q 30/02
See application file for complete search history.

(56) References Cited

U.S. PATENT DOCUMENTS

| 5,812,840 | A  | * | 9/1998  | Shwartz ............... G06F 16/2423 |
| 6,064,981 | A  |   | 5/2000  | Barni et al. |
| 6,519,601 | B1 | * | 2/2003  | Bosch ................. G06F 16/2282 |
| 6,879,962 | B1 | * | 4/2005  | Smith .................. G06Q 10/025 705/22 |
| 6,915,268 | B2 |   | 7/2005  | Riggs et al. |
| 7,443,282 | B2 |   | 10/2008 | Tu et al. |
| 7,667,604 | B2 |   | 2/2010  | Ebert et al. |
| 7,698,204 | B2 |   | 4/2010  | Abendroth |
| 8,099,371 | B1 | * | 1/2012  | Wade ................. G06Q 10/0831 705/331 |
| 8,984,535 | B2 |   | 3/2015  | Wiseman et al. |

(Continued)

FOREIGN PATENT DOCUMENTS

CA    2 425 559 A1    5/2002

OTHER PUBLICATIONS

Lorchirachoonkul, William. Development of end-to-end global logistics integration framework with virtualisation and cloud computing. Diss. RMIT University, 2013. (Year: 2013).*

*Primary Examiner* — Asfand M Sheikh
(74) *Attorney, Agent, or Firm* — Merchant & Gould P.C.

(57) ABSTRACT

The systems and methods described herein relate to managing transportation of loads of items within a retail supply chain. A unified load tracking system aggregates information from multiple supply chain computing systems for presentation on a user interface accessible by multiple users. One user interface provide access to a multitude of information that is interconnected by a common, unique identifier for each movement of a load between an origin and destination. A load board is also provided which automates the spot market auction process and load tender process between carriers and a retail enterprise transportation management system.

18 Claims, 14 Drawing Sheets

(56) References Cited

U.S. PATENT DOCUMENTS

| | | | |
|---|---|---|---|
| 9,600,797 B2* | 3/2017 | Moir | G06Q 10/0833 |
| 10,521,756 B2* | 12/2019 | Bender | G06Q 10/0832 |
| 10,678,866 B1* | 6/2020 | Ranganathan | G06F 40/197 |
| 2002/0087371 A1 | 7/2002 | Abendroth | |
| 2002/0198774 A1 | 12/2002 | Weirich | |
| 2004/0249699 A1 | 12/2004 | Laurent et al. | |
| 2005/0021346 A1 | 1/2005 | Nadan et al. | |
| 2005/0119904 A1* | 6/2005 | Tissington | G06Q 10/08 705/332 |
| 2005/0149373 A1* | 7/2005 | Amling | G06Q 10/08 705/28 |
| 2005/0149453 A1 | 7/2005 | Amling et al. | |
| 2005/0278063 A1* | 12/2005 | Hersh | G06Q 10/087 700/216 |
| 2006/0109964 A1 | 5/2006 | Skelton | |
| 2006/0229895 A1* | 10/2006 | Kodger, Jr. | G06Q 10/08 705/333 |
| 2007/0038506 A1 | 2/2007 | Noble et al. | |
| 2007/0038673 A1* | 2/2007 | Broussard | G06Q 50/28 |
| 2009/0125350 A1* | 5/2009 | Lessing | G06Q 10/0631 705/7.12 |
| 2009/0234702 A1* | 9/2009 | Chester | G06Q 10/0875 705/7.13 |
| 2010/0057592 A1* | 3/2010 | Moir | G01G 23/3742 705/29 |
| 2010/0262453 A1* | 10/2010 | Robinson | G06Q 10/0875 705/330 |
| 2011/0153470 A1* | 6/2011 | Miller | B61L 27/00 705/28 |
| 2012/0303538 A1* | 11/2012 | Marcus | G06Q 30/06 705/330 |
| 2013/0317929 A1 | 11/2013 | Schnorf et al. | |
| 2014/0195454 A1* | 7/2014 | Richie | G06Q 10/0833 705/333 |
| 2014/0222708 A1* | 8/2014 | Becker | G06Q 10/0833 705/333 |
| 2014/0258818 A1* | 9/2014 | Schwartz | G06F 40/174 715/205 |
| 2015/0032656 A1 | 1/2015 | Ricciardi et al. | |
| 2016/0103592 A1 | 4/2016 | Prophete et al. | |
| 2016/0171439 A1* | 6/2016 | Ladden | G06Q 10/0832 705/340 |
| 2017/0046803 A1* | 2/2017 | Wang | G06Q 10/025 |
| 2017/0308850 A1 | 10/2017 | Roush et al. | |
| 2018/0068269 A1 | 3/2018 | Pillai et al. | |
| 2018/0249130 A1* | 8/2018 | Arena | H04M 1/72522 |
| 2019/0066033 A1* | 2/2019 | Mains, Jr. | G06Q 10/06311 |
| 2019/0066041 A1* | 2/2019 | Hance | G01C 21/343 |
| 2019/0073735 A1* | 3/2019 | Conlon | H04L 67/535 |
| 2019/0213538 A1* | 7/2019 | Bebout | G06Q 10/0835 |
| 2019/0362311 A1* | 11/2019 | Bolha | G06Q 10/08355 |
| 2019/0392380 A1* | 12/2019 | O'Brien | B65G 1/1371 |
| 2020/0118068 A1* | 4/2020 | Turetsky | H04L 9/0637 |
| 2020/0175472 A1* | 6/2020 | Kaiser | G06Q 10/0835 |
| 2021/0158275 A1 | 5/2021 | Helvie et al. | |

\* cited by examiner

| | | | | | | | |
|---|---|---|---|---|---|---|---|
| HOME | LOAD BOARD | LOAD TRACKING | | | | | |

Filter Loads
Origin Location
View All Loads ▼   442 ▼   [Refresh]

| Load ID | Load Date | Delivery Date | Status | Origin | Origin Address | Destination | Destination Address | Weight |
|---|---|---|---|---|---|---|---|---|
| 16584923 | 11/29/2018 | 11/29/2018 | TNDR_REJ | Vendor 1 | 123 Maple St Scranton, PA | Warehouse 89 | 567 Redwing Ave Carroll, IA | 2699 |
| 16584924 | 11/29/2018 | 11/29/2018 | TNDR_REJ | Vendor 2 | 498 Snelling St St. Paul, MN | Store 53 | 111 Hennepin Ave Minneapolis, MN | 1058 |
| 16584925 | 11/29/2018 | 11/29/2018 | TNDR_REJ | Vendor 3 | 101 Church Ave Mt. Vernon, VT | Distribution 68 | 1092 C Ave Kansas City, KS | 3001 |
| 16584926 | 11/29/2018 | 11/30/2018 | TNDR_REJ | Vendor 1 | 123 Maple St Scranton, PA | Warehouse 13 | 1 Retailer Pl Jefferson, IL | 2909 |
| 16584927 | 11/30/2018 | 11/30/2018 | TNDR_REJ | Vendor 4 | 1001 Dakota Cir Hereford, NE | Store 99 | Coconut Blvd Miami, FL | 2941 |
| 16584928 | 11/30/2018 | 11/30/2018 | TNDR_REJ | Vendor 5 | 5098 22nd St Beaver, SD | Store 53 | 111 Hennepin Ave Minneapolis, MN | 1998 |
| 16584929 | 11/30/2018 | 11/30/2018 | TNDR_REJ | Vendor 2 | 498 Snelling St St. Paul, MN | Distribution 12 | Mountainview Ave Red Oak, CA | 2012 |

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |

B

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | | 2846 | | | | | | |

C

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | | 2846 | 16597036 | | FedEx | XPOL | | |

D

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| | 3851 | | | 921 | | | 409 | 332 |

B

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | | | 921 | | | 409 | 332 |

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2848 | 16597042 | 921 | FedEx | MIPR | 409 | 332 |
| B70I33Q | 4987 | 2849 | 16597048 | 476 | UPS | RBWR | 937 | 211 |

B

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2847 | 16597042 | 921 | FedEx | MIPR | 409 | 332 |
| B70I33Q | 4987 | 2849 | 16597048 | 476 | UPS | RBWR | 937 | 211 |
| G88T42E | | 2851 | | | | | | |

C

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2847 | 16597042 | 921 | FedEx | MIPR | 409 | 332 |
| B70I33Q | 4987 | 2848 | 16597048 | 476 | UPS | RBWR | 937 | 211 |
| G88T42E | | 2849 | | | | | | |

D

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2847 | 16597042 | 921 | FedEx | MIPR | 409 | 332 |
| B70I33Q | 4987 | 2848 | 16597048 | 476 | UPS | RBWR | 937 | 211 |
| G88T42E | | 2849 | | | | | | |
| P90L31L | | 2851 | | | | | | |

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2847 | 16597042 | 921 | FedEx | MIPR | 409 | 332 |
| B70I33Q | 4987 | 2848 | 16597048 | 476 | UPS | RBWR | 937 | 211 |
| G88T42E | | | | 466 | Uber | ORTY | 890 | 224 |
| P90L31L | | 2851 | 16597134 | | USPS | NVYU | | |
| Y87X89Z | | 2852 | | | | | | |

B

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2847 | 16597042 | 921 | FedEx | MIPR | 409 | 332 |
| B70I33Q | 4987 | 2848 | 16597048 | 476 | UPS | RBWR | 937 | 211 |
| G88T42E | | 2851 | 16597134 | 466 | Uber | ORTY | 890 | 224 |
| P90L31L | | | | | USPS | NVYU | | |
| Y87X89Z | | 2852 | | | | | | |

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2847 | 16597042 | 921 | FedEx | MIPR | 409 | 332 |
| B70I33Q | 4987 | 2848 | 16597048 | 476 | UPS | RBWR | 937 | 211 |
| G88T42E |  | 2851 | 16597134 | 466 | Uber | ORTY | 890 | 224 |
| P90L31L |  | 2852 | 16597134 |  | USPS | NVYU |  |  |
| Y87X89Z |  |  |  |  |  |  |  |  |

D

| Movement ID | Manifest ID | Schedule ID | Load ID | Trailer # | Carrier Name | SCAC | Origin T-number | Destination T-number |
|---|---|---|---|---|---|---|---|---|
| B50R32T | 1829 | 2186 | 16584923 | 189 | Uber | RBWR | 269 | 749 |
| P05G22V | 2985 | 2846 | 16597036 | 512 | FedEx | XPOL | 101 | 89 |
| U89C20W | 3851 | 2847 | 16597042 | 921 | FedEx | MIPR | 409 | 332 |
| B70I33Q | 4987 | 2848 | 16597048 | 476 | UPS | RBWR | 937 | 211 |
| G88T42E |  | 2851 | 16597134 | 466 | Uber | ORTY | 890 | 224 |
| P90L31L |  | 2852 | 16597134 |  | USPS | NVYU |  |  |

FIG. 13B

LOAD TRACKING COMPUTING PLATFORM AND USER INTERFACE

TECHNICAL FIELD

The present disclosure is directed to methods and systems for tracking loads of items within a supply chain. More particularly, the present disclosure describes a load tracking computing platform for tracking freight shipments within a supply chain and aggregating information from multiple supply chain management systems using one user interface.

BACKGROUND

Managing movement of items within a supply chain for a large enterprise requires the use of multiple software tools. Different computing systems handle operations for transportation, inventory, and warehouse management. Each system requires a different login and utilizes a different user interface to access information. Additionally, each system uses different identifiers to track items, trailers, and loads. In order to accurately determine the status of various shipments of items, multiple applications are often required to be accessed and/or carriers are required to be contacted manually.

Still further, although enterprises often have contracts with carriers on particular shipping lanes, those carriers may not have capacity to take on a given load, or may be unwilling to take on a given load based on then-current prices for the load. In such circumstances, some software applications exist that allow organizations to present a load board at which carriers may bid on loads. Such bids on loads may result in higher or lower prices for a given load than is agreed to with a designated, or pre-contracted carrier. This introduces additional burdens for enterprises that manage item transportation within their respective supply chains, because it may be difficult to arrange for alternate carriers, and may be difficult to predict the price that may be required to be paid to such an alternative carrier.

Additionally, in this context, for primary and alternative contracted carriers, as well as auction-winning carriers, it can be difficult to determine the status of loads, and more specifically goods within a given load, within an organization's supply chain. This is exacerbated by the fact that carriers may have electronic or paper records, and may or may not be well-integrated and utilize EDI transaction flows. Still further, in some instances a record associated with a warehouse may remain static, but the associated record identifying a transportation load may change, for example due to logistical changes or changes in carrier. It can be difficult, therefore, to maintain complete records of the location of an item throughout an enterprise supply chain that utilizes such a wide variety of carriers and software systems for record management in different contexts.

It is against this background that the present disclosure is made. Techniques and improvements are provided herein.

SUMMARY

In general terms, the present disclosure relates to methods and systems for tracking loads of items within a supply chain. In particular, a unique identifier is used to aggregate information about load movements from multiple different supply chain management systems to present a unified view of load tracking information on a user interface. Additionally, a load board provides access to secondary markets for carriers to ship loads for a retailer.

According to at least one aspect of the present disclosure, a computing system for tracking freight movements within a retail supply chain comprises: an edge layer application programming interface (API) configured to aggregate and correlate load tracking data from a plurality of supply chain management computing systems; a user interface configured to communicate visual representations of the load tracking data to a plurality of computing devices for display; a load board tool configured to: automatically identify eligible loads for spot market auction; send information about the eligible loads to a virtual board accessible by carrier computing devices; receive one or more bids from one or more of the carrier computing devices for the spot market auction; automatically determine winning bids for the spot market auction; and automatically create and send load tenders for the winning bids and the eligible loads; and a load tracking tool configured to: generate visualizations of planned virtual movements and executed physical movements within the retail supply chain based on the aggregated and correlated load tracking data; and automatically generate alerts and status events.

In another aspect, a computer-implemented method of tracking movements of loads of items within a retail supply chain comprises: aggregating and correlating load tracking data received from a plurality of different supply chain management computing systems through an edge layer; generating visual representations of virtual movements and physical movements, load statuses, and locations of loads in near real-time, based on the aggregated and correlated load tracking data; generating status updates and alerts based on the aggregated and correlated load tracking data; and communicating the visual representations, status updates, and alerts to a plurality of computing devices through a single graphical user interface (GUI) accessible through an application programming interface (API).

In another aspect, a computer-implemented method of managing a load board comprises: identifying, with a transportation management system, one or more loads of items eligible for spot market auction; posting information about the one or more loads on the load board, the load board accessible by a plurality of carrier computing devices through an application programming interface (API); receiving one or more bids from one or more of the carrier computing devices in the spot market auction; automatically determining winning bids for each of the loads; and automatically creating and sending, with the transportation management system, load tenders for the winning bids and corresponding loads to the carrier computing devices associated with the winning bids.

In yet another aspect, a computer-implemented method of tracking movement of loads of items within a retail supply chain comprises: scheduling a delivery of a load of one or more items from an origin to a destination within the retail supply chain, the delivery having a schedule ID; creating a movement identifier (ID) comprising an alphanumeric having at least 4 characters; linking the movement ID with the schedule ID of the delivery in a record; assigning the load to a trailer; linking a trailer ID for the trailer with the movement ID in the record; before a trailer close event occurs associated with the trailer, assigning a manifest ID to the movement ID based on the scheduled delivery of the load; and publishing the movement ID and linked schedule ID, trailer ID, and manifest ID to a messaging system, the messaging system being accessible by a plurality of computing systems through an application programming interface (API).

In another aspect, a supply chain management computing system comprises: a processor; and a memory communicatively coupled to the processor, the memory storing instructions which when executed by the processor, causes the computing system to: schedule a delivery of a load of one or more items from an origin to a destination within the retail supply chain, the delivery having a schedule ID provided by a node transportation application (NTA); create a movement identifier (ID) comprising an alphanumeric having at least 4 characters; link, using a movement ID service, the movement ID with the schedule ID in a table in a data store; assign, using a transportation management (TM) system, the load to a trailer; linking a trailer ID for the trailer with the movement ID in the table; before a trailer close event associated with the trailer occurs at the origin, assign a manifest ID generated by a warehouse management system (WMS) to the movement ID based on the scheduled delivery; link the manifest ID to the movement ID in the table; publish the movement ID and linked schedule ID, trailer ID, and manifest ID to a messaging system; and generate a graphical user interface (GUI) displaying information from the manifest alongside information linked to the trailer ID to show a near-current location of specific items shipped from a warehouse location during shipment by a third-party carrier.

In yet another aspect, a method of linking data from different retail supply chain management systems comprises: receiving, at a computing device, a schedule ID generated by a node transportation application (NTA) to represent a scheduled delivery of a load of items from an origin to a destination on a delivery date; generating a movement ID to be associated with the schedule ID; storing the movement ID and schedule ID together in a table; receiving, at the computing device from a transportation management system, a load ID, carrier name, and standard carrier alpha code (SCAC) for a planned trailer movement between the origin and the destination; storing the load ID, carrier name, and SCAC with the movement ID and schedule ID in the table; prior to trailer close at the origin, receiving at the computing device a request from a warehouse management system (WMS) for a movement ID, the request including an origin identifier, a destination identifier, a manifest ID, and a trailer number; storing the origin identifier, destination identifier, manifest ID, and trailer number with the movement ID, schedule ID, load ID, carrier name, and SCAC in the table; sending the movement ID to the WMS; and publishing the movement ID and associated schedule ID, load ID, carrier name, SCAC, origin identifier, destination identifier, manifest ID, and trailer number to a messaging system.

BRIEF DESCRIPTION OF THE DRAWINGS

FIG. 9 illustrates an example of a load tracking view of a graphical user interface.

FIG. 10 illustrates examples of movement ID tables.

FIG. 11 illustrates examples of movement ID tables.

FIG. 12 illustrates examples of movement ID tables.

FIG. 13A illustrates examples of movement ID tables.

FIG. 13B illustrates examples of movement ID tables.

DETAILED DESCRIPTION

Figure 1:
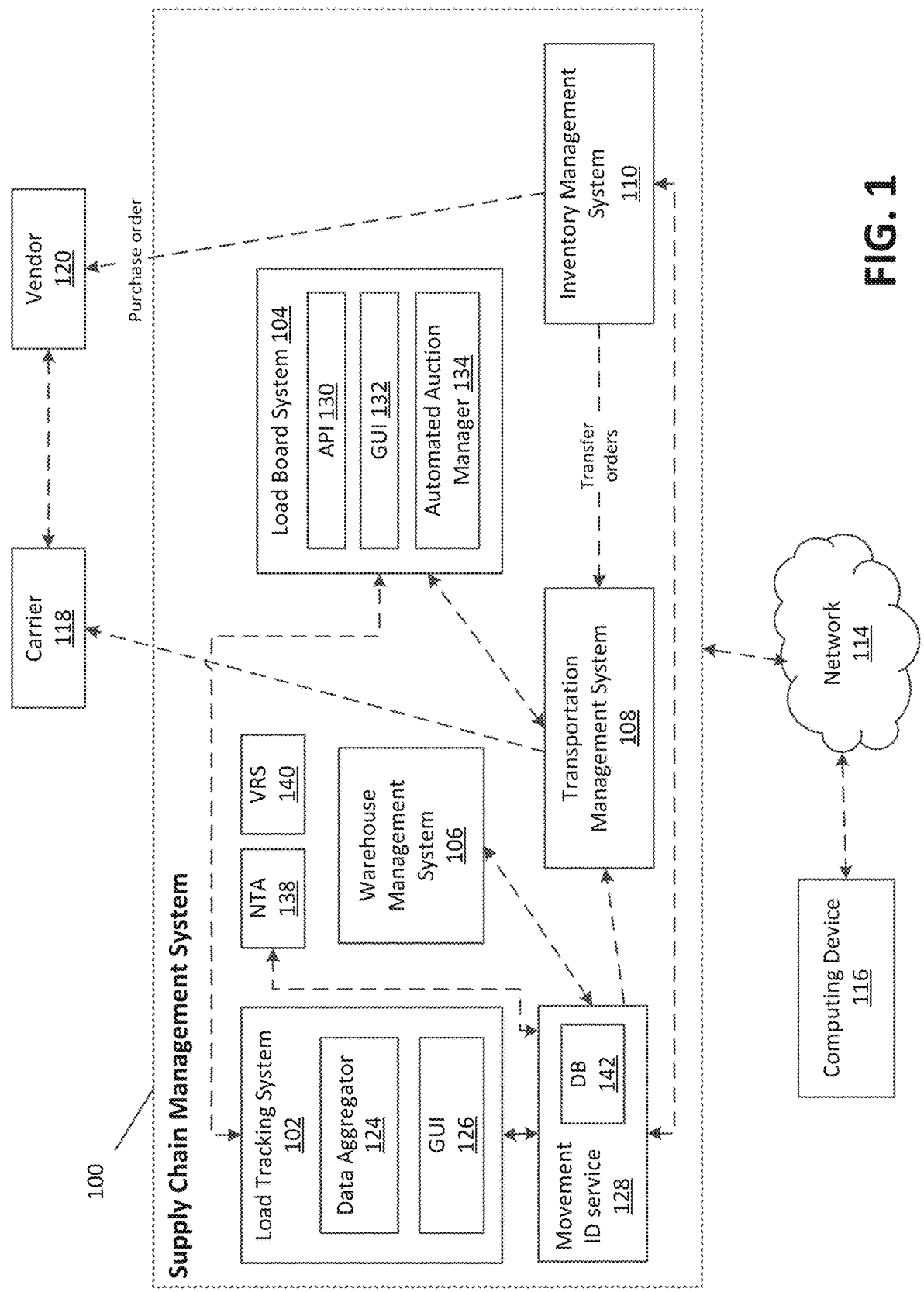
FIG. 1 illustrates a schematic diagram of a supply chain management system.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The systems and methods described herein relate to managing transportation of loads of items within a retail supply chain. A unified load tracking system aggregates information from multiple supply chain computing systems to present that information on a user interface accessible by multiple users. One user interface provides access to a multitude of information that is interconnected by a common, unique identifier for each movement. A load board also provides carriers with easy access to information about available loads and provides retailers with easy access to bids from carriers for their loads. The load board manages automated auctions and automated load tendering. The load board information can also be accessed with the single user interface.

An edge layer connects all of the supply chain management systems for a retail enterprise. Data is aggregated from the supply chain management systems and is presented at a single user interface. This simplifies the process of determining the status of shipments by eliminating the need to contact carriers or access various computing systems via separate user interfaces.

A great deal of manual interactions with supply chain management computing systems were required previously. In one particular example, to change a load from a regional distribution center to a store which is paired to a backhaul, a user would have to access 9 separate applications and services, such as a transportation logistics management application, an electronic data interchange (EDI) message management application, a warehouse management system, a load tracking application, a store inventory application, and a global inventory application. Even when using those applications, it may be difficult, if not impossible, to determine the exact location of a particular item, given that the warehouse management system (which may track by carton of items) may track items differently than the to load tracking application (which may track by load), which may in turn track items differently from a store inventory application (which may track items on a per-item basis). This would take about 14 minutes to execute. In another example, to determine whether or not a load was correctly tendered to a carrier, a user would have had to access four separate applications. With the load tracking system described herein, a user can view, execute, and configure various operations with a single user interface.

The system described herein allows internal and external users to conduct a variety of operations within one solution which orchestrates a user's experience and data aggregation across multiple platforms. One synergistic experience allows a user to access a single platform, replacing the multiple interactions within multiple interfaces required previously. This solution also enables a framework to allow for future scalability for domestic operations and an opportunity to create systemic interactions between domestic transportation operations, a transportation command center and carriers in one seamless experience. Additional advantages are achieved, as further explained below.

Load Board

As mentioned above, in some aspects of the present disclosure, an integrated load board is provided that presents carriers various loads for bidding to secondary carriers. Historical data regarding load pricing may be analyzed to determine an optimal carrier strategy when selecting between a contracted carrier and submission of a load to the load board for auction. Carrier near-real-time pricing analytics are used to compare market rates with contracted rates for carriers. Data can be analyzed at a granular level to determine an optimum sourcing strategy. A common load board has the ability to automate auction eligible loads. Loads that are eligible for auction are identified. Information regarding the load is sent and received through the API. The load tender process is also automated for the carrier through an API.

The load board system includes both traditional load board capability as well as enabling an automated dynamic rating capability. The automated capability reduces the manual workload required to obtain supplemental capacity within a constrained capacity landscape. Near real-time pricing analytics are employed to obtain market rates vs. contracted rates at a more granular level to influence sourcing strategies for the retailer. Still further, the load board may include one or more automated rules that can be implemented to ensure that carriers having contracted rates for a given shipping route are unable to decline a pre-contracted rate and instead bid on the same load (in cases where the bid amount would be less than the contracted rate).

Load Tracking

In addition, in example embodiments, a data structure is provided that allows for linking of load and warehouse data across various software systems. Accordingly, data from multiple sources is correlated and aggregated automatically. All carrier status events are aggregated at the load tracking system. Updates can be viewed using a graphical user interface (GUI) to provide real-time visibility of events occurring through the supply chain. Alerts are automated for particular events and exceptions. The GUI allows for visualization of both virtual planned movements and actual physical movements of items and trailers.

Using the GUI, loads can be filtered in various user-defined configurations to access particular load information. Through the use of a unique movement ID, available metadata such as Node Transportation Application (NTA) schedule ID, Vendor Ready to Ship (VRS) shipment ID, Transportation Manager (TM) load ID, TM trip ID, associated shipment windows, associated computed departure and arrival windows, EDI 204 tender timing, EDI 990 status, EDI 214 segment statuses, DCI or OSN (manifest ID), trailer number, Bill of Lading (BOL) and yard time stamps can be correlated. Accordingly, in accordance with the present disclosure, the unique movement ID acts as a link across heterogeneous transportation management and tracking systems for accurate joinder of shipment status information, while providing a common identifier across first, middle, and last mile freight movements for visualization and reporting.

In addition to receiving shipment updates and tracking, the load tracking system can manage information relating to carrier reason codes for late or missed pickups. The load tracking system can also handle root cause delineation information received from free form text fields.

Through use of the data structure, an identifier for a particular load at a warehouse may be linked to another identifier for the same particular load as managed by a carrier, despite the fact that the relationship between the warehouse identifier and carrier identifier may change, e.g., due to changed transportation conditions. Additionally, use of such an identifier avoids having to modify each database associated with each application that is otherwise used within a supply chain, and provides a single point from which a load of data may then be accessed by utilizing the related identifiers managed within that data structure.

FIG. 1 illustrates an example supply chain management system 100. The supply chain management system 100 operates within a retail enterprise, and can be implemented across a variety of heterogeneous computer-implemented systems that are each usable to manage and operate various functions within a retail supply chain. The supply chain management system 100 includes a load tracking system 102, a load board system 104, and a movement ID service 128. The supply chain management system 100 also includes a warehouse management system 106, a transportation management system 108, and an inventory management system 110. The supply chain management system 100 communicates with one or more computing devices 116 via a network 114.

The load tracking system 102 operates to gather information about load movements within the supply chain and present that information on a unified user interface accessible by multiple types of users. The loading tracking system 102 includes a data aggregator 124 and a graphical user interface (GUI) 126. The data aggregator 124 operates to aggregate and correlate information from various supply chain management computing systems such as the warehouse management system 106, transportation management system 108, NTA 138, and VRS 140. In some embodiments, the load tracking system 102 aggregates information received from electronic data interchange (EDI) messages sent from multiple different computing systems. Different computing systems refers to independent computing systems that utilize different data formats or handle separate functions and are not designed to integrate with one another. The EDI messages could include EDI 204 (Motor Carrier Load Tender), EDI 213 (Motor Carrier Shipment Status Inquiry), EDI 216 (Motor Carrier Shipment Pick-up Notification), and EDI 990 (Accept or Decline the 204 Shipment), just to name a few. In some embodiments, the EDI messages include EDI 204 (tender timing), EDI 990 (status), and EDI 214 (segment statuses). In the example of FIG. 1, the warehouse management system 106 and transportation management system 108 could be completely independent systems that operate using different data formats that cannot communicate with each other directly.

The GUI 126 generates visualizations of the information aggregated by the data aggregator 124. The visualizations represent current locations of loads, planned movements, position of loads on trailers, and status of loads. In some embodiments, the visualizations present the load information in a table format, as illustrated in the example GUI of FIG. 9, described below. In response to queries, the GUI 126 can present information about particular trailers or loads. In some embodiments, the GUI 126 is accessible by a plurality of other computing devices through an API.

The movement ID service 128 operates to provide a unified identifier that links warehouse management system 106 information to transportation management system 108 information. In some embodiments, information from the NTA 138 and VRS 140 can be linked to a movement identifier (ID) by the movement ID service as well. In example embodiments, the movement ID service 128 generates a unique identifier as part of a data structure that also stores information identifying a load in other systems such as the NTA 138 and VRS 140. Through use of such a data structure, an enterprise user may more readily be able to view movement of a load from end to end within a supply chain. In some embodiments, the data structure is a record. In some embodiments, the data structure is a table. In some embodiments, the data structure is stored in a data store 142 in communication with the movement ID service 12. In some embodiments, the movement ID service 128 further operates to link additional IDs with the movement ID in the data structure as they become available from other systems.

The load board system 104 operates to generate and maintain a load board accessible by carriers and the retail enterprise. The load board system 104 includes an application programming interface (API) 130, a graphical user interface (GUI) 132, and an automated auction manager 134. Information about loads eligible for spot market auction can be uploaded to the load board system 104 by the transportation management system 108. Carriers 118 can access the load board through the API 130 and view available loads using the GUI 132.

The automated auction manager 134 determines winning bids for loads posted to the load board. In some embodiments, the automated auction manager 134 will initiate the load tender process by communicating with the transportation management system 108. In some embodiments, this could be accomplished by sending an EDI 204 to the winning carrier's computing system. The automated auction manager 134 will apply one or more rules to control the carriers who may bid for a given load posted to the load board. Details regarding the load board, and rules, are provided below in conjunction with FIG. 6.

The warehouse management system 106 manages all events that occur at nodes (warehouse, distribution center, or storage at retail store) in the process of moving inventory through the supply chain. Warehouse operations differ between receive centers, distribution centers, and storage in retail stores. Inbound processing typically occurs at receive centers and distribution centers as items are shipped in from vendors or are transferred in from other nodes within the supply chain. The incoming items are put into storage at the node or are prepared for further shipment within the supply chain. The warehouse management system 106 functions to confirm various events as items are moved from node to node, such as trailer close or receipt of items at a node. The warehouse management system 106 tracks the physical movements of items within the warehouse environment, e.g., from the point of receipt through the trailer's release from the warehouse node. For example, the warehouse management system 106 may track items based on a predetermined unit volume, and will monitor which items are to be received, routed, and repacked for transport from the warehouse to one or more retail locations.

The transportation management system 108 receives instructions from the inventory management system 110 to transport items between nodes of the supply chain. This generally involves communicating with carriers 118 to ship loads on trailers from node to node. Typically, the transportation management system 108 operates separately from the warehouse management system 106 and utilizes different computing systems to implement its functions. The transportation management system 108 functions to plan future movements of items within the supply chain.

The inventory management system 110 operates to oversee the amount and location of every item in stock at different nodes within a supply chain. The inventory management system 110 determines whether additional inventory is needed within the supply chain and issues purchase orders to vendors 120. The inventory management 110 system can also determine when items need to be redistributed within the supply chain. If more stock of a particular item is needed at a different node, the inventory management system 110 issues a transfer order to the transportation management system 108.

The node transportation application (NTA) 138 operates to generate delivery schedules. NTA 138 handles virtual planning of movements of loads of items. NTA 138 generates schedule IDs for each delivery.

The Vendor Ready to Ship (VRS) application 140 integrates notifications from a vendor indicating that the vendor is prepared to ship requested items. The VRS 140 may, for example, receive notifications from vendors, and based on invoice information, initiate logistics fora load via the NTA 138.

As described herein, the various applications and inventories management systems present throughout the supply chain 100 represent different applications that store heterogeneous data, for example tracking items at different volumes, or in different combinations, tracking loads in different ways or at different points in time, and otherwise being uncoordinated other than through EDI transactions which occur at transition points in a supply chain (e.g., from warehouse to trailer, or trailer to retail location). Through use of a data structure including a movement ID, data may be associated with the movement ID as it becomes available from the various applications, thereby building a larger picture of movement of the item throughout the supply chain.

Figure 2:
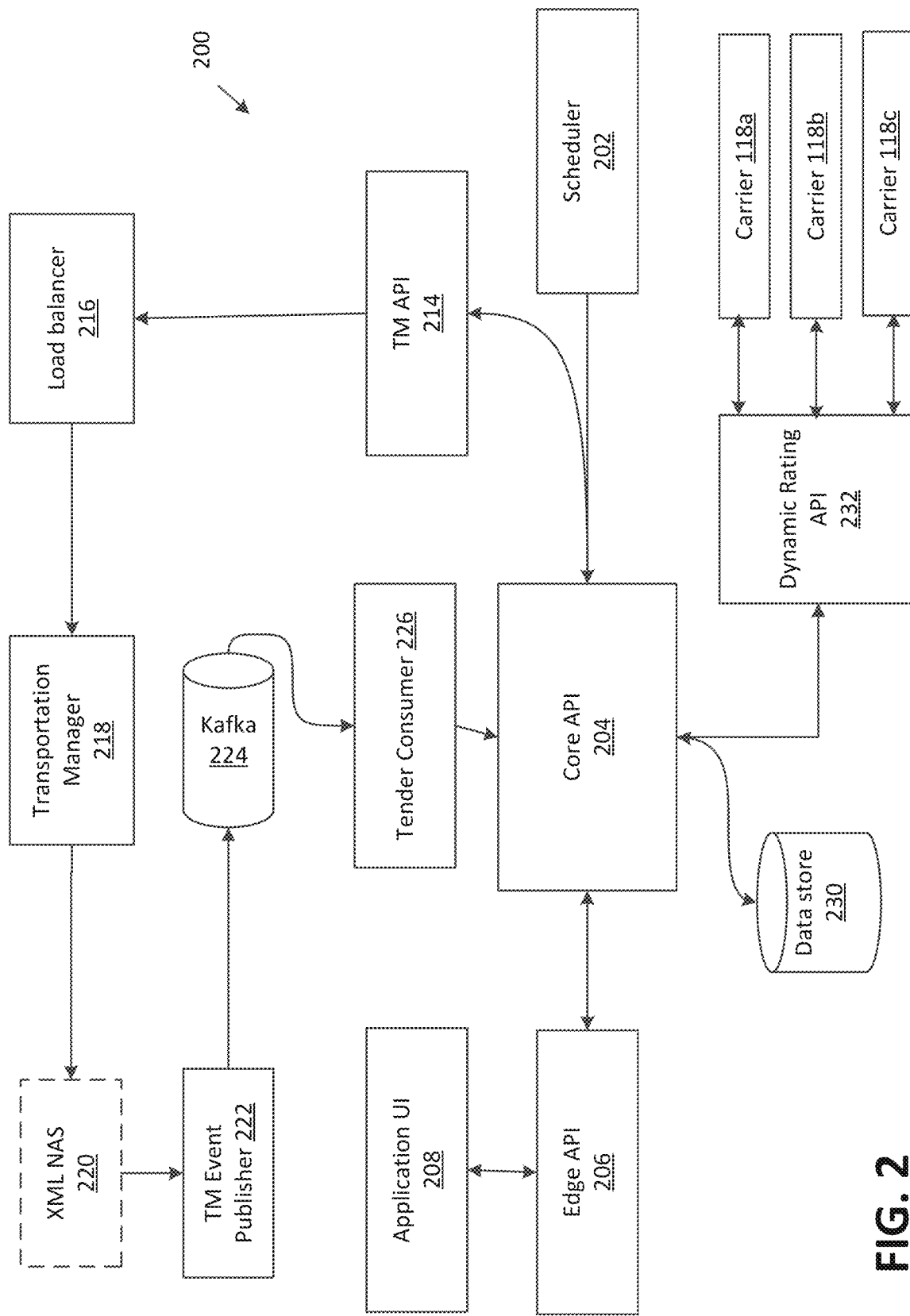
FIG. 2 illustrates a schematic diagram of a load tracking system usable within the supply chain management system of FIG. 1.

FIG. 2 illustrates a more detailed schematic diagram 200 of selected components of the supply chain management system 100, showing integration of the load tracking system and load board system with various other applications in an enterprise supply chain environment in a way that allows visibility to item movements and positioning throughout the supply chain. The diagram 200 illustrates an event based real time supply chain management infrastructure that provides visibility across the various warehouse, load/carrier, and enterprise inventory tracking systems despite possible changes to relationships between loads and warehouse inventories (e.g., due to changes in load/carrier schedules, carriers, changes in quantity or collections of items tracked, etc.).

The scheduler 202 operates to match loads of items with trailers to transport those items from an origin to a destination within the supply chain. The scheduler 202 communicates information for loads that need to be transported to the core API 204. The core API 204 manages persisted data and decides auction winners. When a load is put on a spot market auction, carriers can bid on the available loads using the load board. Information from the core API 204 is communicated through an edge API 206 to an application user interface (UI) 208. Computing devices can access the application UI 208 to access information fetched through the edge API 206.

The transportation manager (TM) API 214 makes information from the core API 204 available to the load balancer 216. The load balancer 216 manages the execution of load tender events in accordance with the results of the spot market auctions. Instructions are communicated to the transportation manager (TM) 218 to execute tender events. The TM event publisher 222 receives updates about item movement events that are occurring to transport loads and communicates tender events to a Kafka topic 224. In some embodiments, the item movement events are communicated from the transportation manager 218 to the TM event publisher 222 via extensible markup language (XML) network attached storage (NAS) 220. The tender consumer 226 accesses the Kafka topic 224 to process messages about tender events and communicate information from the messages to the core API 204. Information from the core API 204 can be stored in and retrieved from a data store 230.

The dynamic rating API 232 receives requests for quotes or bids from the core API 204. The requests are communicated to carriers 118a, 118b, 118c. The carriers 118 receive information about the available loads and can access that information through a load board. Bids or quotes from the carriers 118 are communicated through the dynamic rating API 232 to the core API 204, where the winning bid is determined for each load.

Figure 3:
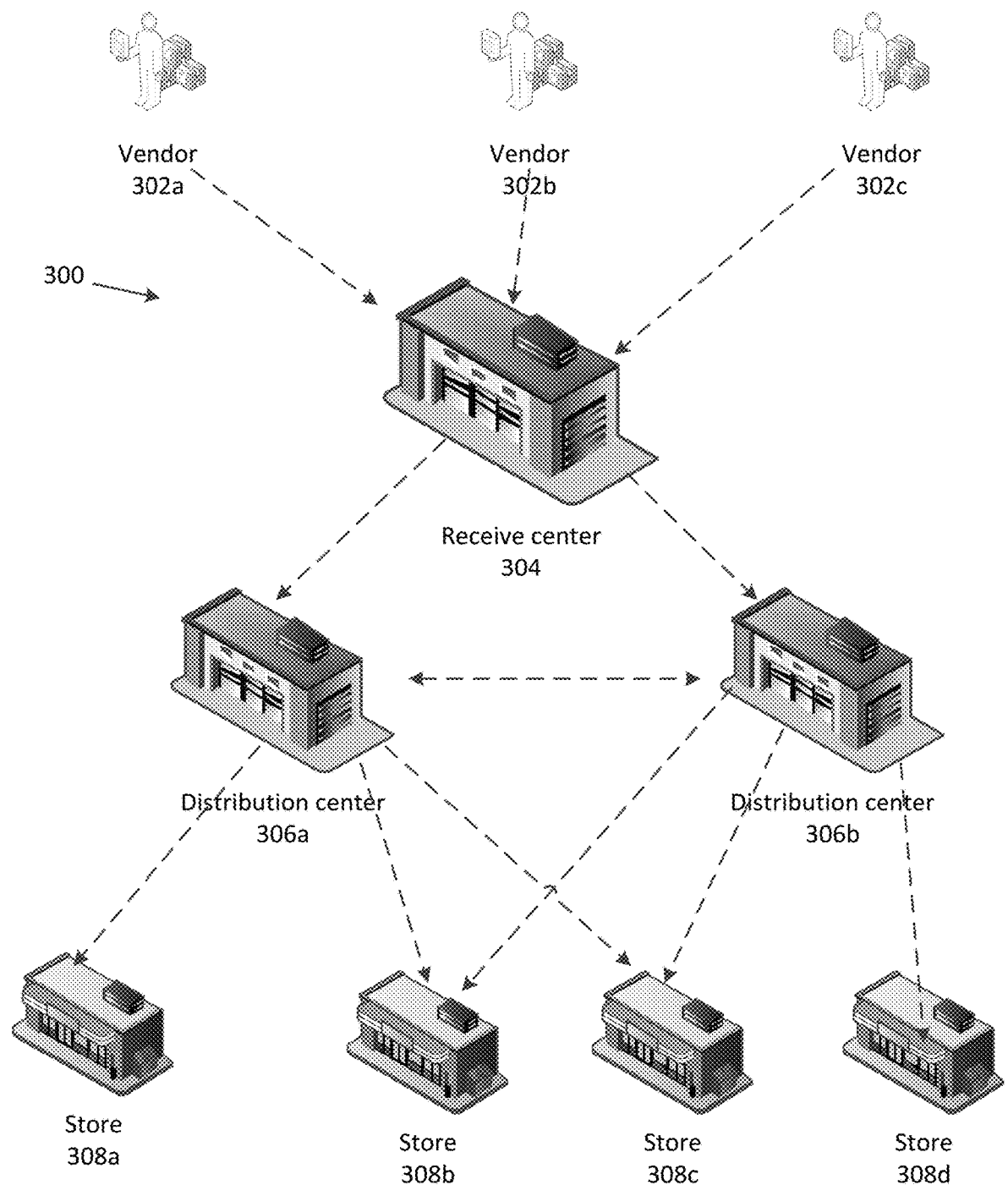
FIG. 3 illustrates a schematic diagram of an example supply chain for a retail enterprise.

FIG. 3 illustrates a schematic diagram 300 of an example supply chain for a retail enterprise. This is just one simplified example of a supply chain in which the present systems and methods can operate. The diagram 300 illustrates the flow of inventory from vendor 302 to store 308. The inventory moves through various nodes to arrive at the stores 308. In this example, the nodes include a receive center 304, two distribution centers 306a, 306b, and four retail stores 308a, 308b, 308c, 308d. In practice, the supply chain could include many more nodes in different proportions. In some embodiments, there are not separate receive centers and distribution centers. Instead, there may be one type of warehouse for holding inventory before distributing to stores. Arrows in the diagram indicate movement of inventory. Inventory will typically flow downward through the supply chain, but in some instances inventory may move between distribution centers 306 or between retail stores 308. In some embodiments, inventory may even move from a distribution center 306 to a receive center 304 or from a retail store 308 to a distribution center 306.

Vendors 302 produce/provide the items or products that will be sold by the retail enterprise. A purchase order is typically placed to request products from a vendor. In some instances, the vendor 302 will transport the ordered products to a receive center 304. In other instances, the retail entity arranges for the products to be picked up from the vendor 302 and transported to the receive center 304. Once at the receive center 304, the products are prepared for transportation to one or more distribution centers 306. The products may arrive from the vendors in large groupings that need to be broken down into individual units for distribution to distribution centers 306 and/or stores 308. Accordingly, once received into the supply chain of the enterprise, each individual unit can be tracked and shipped among the various nodes of the supply chain.

A variety of products are prepared for shipment to one or more distribution centers 306. The distribution centers 306 are typically positioned to enable quick shipment to one or more retail stores 308. Each distribution center 306 may supply inventory to multiple retail stores 308. In some instances, more than one distribution center 306 will send inventory to a retail store 308. For example, in FIG. 3, distribution center 306a distributes inventory to stores 308a, 308b, and 308c. Distribution center 306b distributes to stores 308b, 308c, and 308d. In some instances, to the extent products received at a distribution center 306 are not already broken down into individual units, the products may be broken down into individual units in order to distribute individual items to stores 308, or optionally to fill online orders that will be delivered directly to customers from the distribution center 306 or store 308.

Once products arrive at the retail stores 308, they are either stored in a back room or displayed on shelves. This inventory is available for in-store purchases, pick-up orders, or local delivery. Depending on the location of a customer ordering products online, the shipments of products could come from one or more retail stores 308, or distribution centers 306. For instance, a customer could receive shipments of products from either store 308b or store 308c, or both (in the instance of a multi-item purchase).

It is noted that, between receive centers 304, distribution centers 306, and stores 308, there may be preexisting, predetermined delivery routes established. For example, there may be daily or weekly transit routes between a receive center and one or more distribution centers. The receive center 308 can provide to the distribution centers 306 the selection of individual items that are needed by stores 308 serviced by the one or more distribution centers 306 proximate to and/or servicing those stores 308. The distribution centers 306 can also have daily or other periodic transportation routes established to stores 308 that are serviced, thereby ensuring prompt replenishment of items at stores in response to item sales.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders. In other embodiments, the systems and methods could operate for distribution channels that distribute supplies to multiple locations within a business rather than selling to individual customers.

Figure 4:
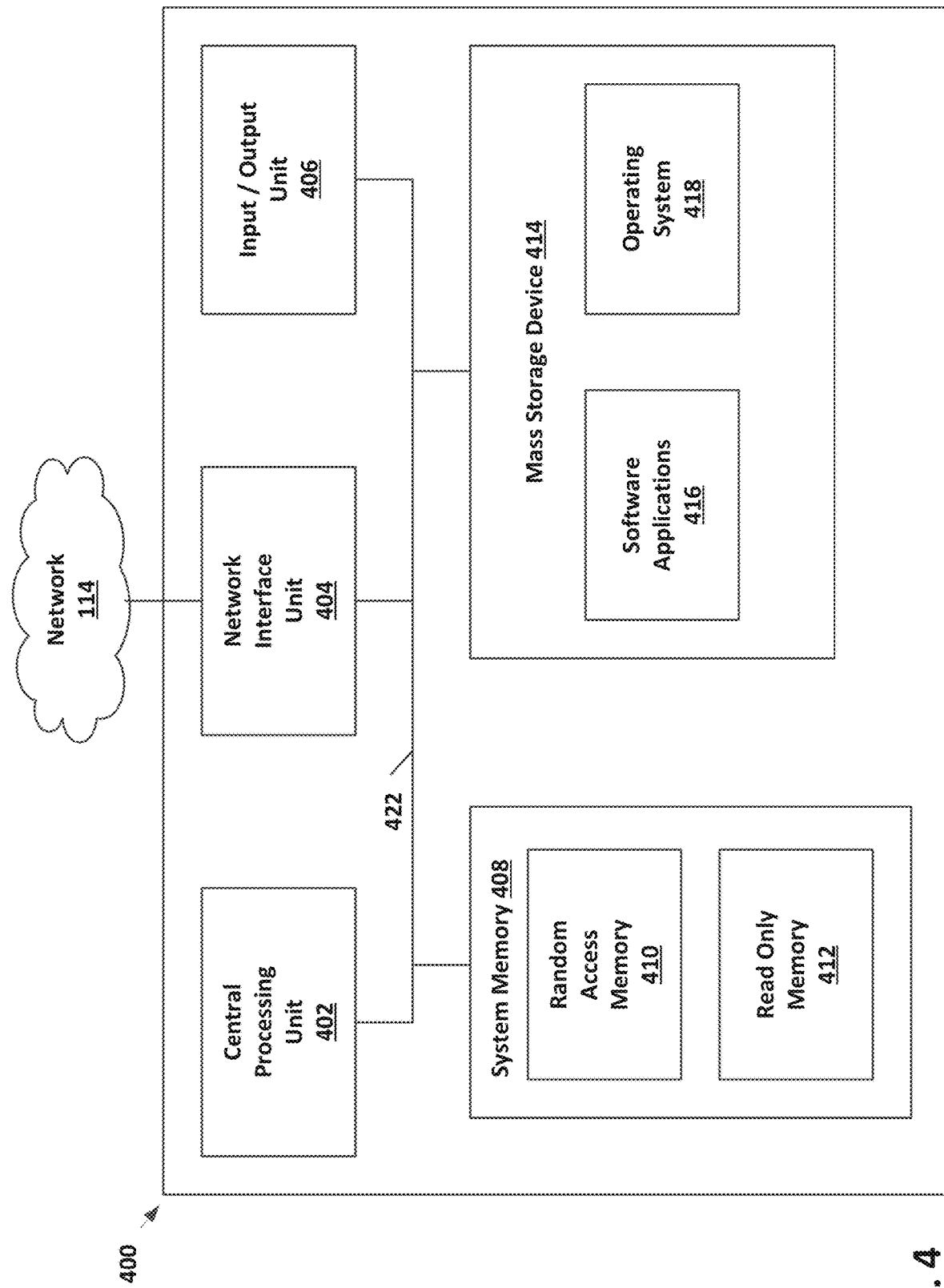
FIG. 4 illustrates an example block diagram of a computing device useable to implement aspects of the supply chain management system of FIG. 1.

Referring now to FIG. 4, an example block diagram of a computing device 400 is shown that is useable to implement aspects of the supply chain management system 100 of FIG. 1. For example, the computing device 400 can be used to access the supply chain management system 100 through the network 114 as computing device 116.

In the embodiment shown, the computing device 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 operates to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to various embodiments, the computing device 400 can operate in a networked environment using logical connections to remote network devices through a network 421, such as a wireless network, the Internet, or another type of network. The computing device 400 may connect to the network 421 through a network interface unit 404 connected to the system bus 422. It should be appreciated that the network interface unit 404 may also be utilized to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document. For example, the mass storage device 414 and/or the RAM 410 can store software instructions that, when executed by the CPU 402, cause the computing system 400 to operate a load board.

Figure 5:
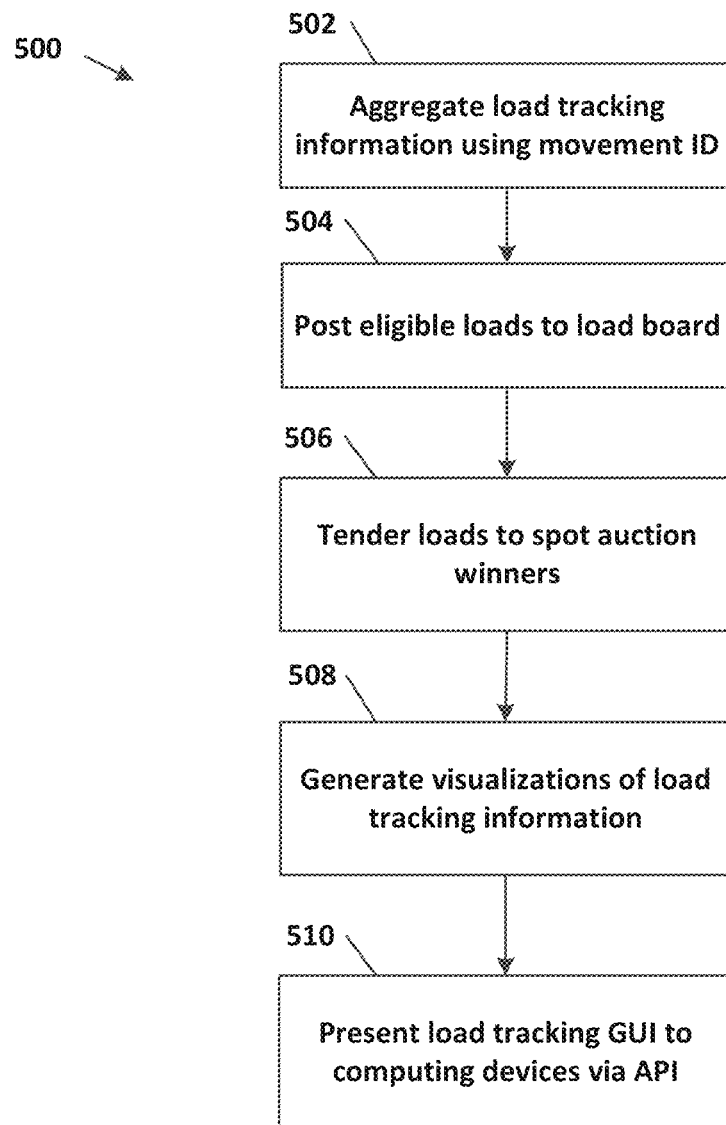
FIG. 5 illustrates a flow diagram of an example method of managing loads within a supply chain.

Referring now to FIG. 5, a flow chart depicting an example method 500 of managing loads within a supply chain is described. The method 500 can be performed by the systems described in FIGS. 1 and 2.

At operation 502, load tracking information is aggregated from multiple different computing systems in the supply chain. A movement ID can be utilized to link different identifiers used by warehouse management systems, transportation management systems, and other systems. The movement ID ties together information about virtual planned movements of items with actual physical movements of items.

At operation 504, loads eligible for spot market auction are identified and posted to a load board. Information about the loads is uploaded to the load board and can be accessed by multiple carriers. The carriers can submit bids on the loads to transport them from an origin to a destination.

At operation 506, loads are tendered to the carriers that had the winning bid on the spot market auction. In some embodiments, the automated auction manager 134 communicates to the transportation management system 108 of FIG. 1 (or 218 in FIG. 2) instructions to automatically issue a load tender to the carrier.

At operation 508, information tracking loads within the supply chain is used to generate visualizations. These are prepared to present information about movements of loads including, for example, which trailer each load is on, the origin and destination of the load, the carrier handling the load, and the current status of the load.

At operation 510, the visualizations of load tracking information are presented on a graphical user interface (GUI) that can be accessed by various computing devices through an API. The load tracking information can be accessed by both the retail enterprise and the carriers so that all parties have a unified view of the status of the loads through one user interface.

Figure 6:
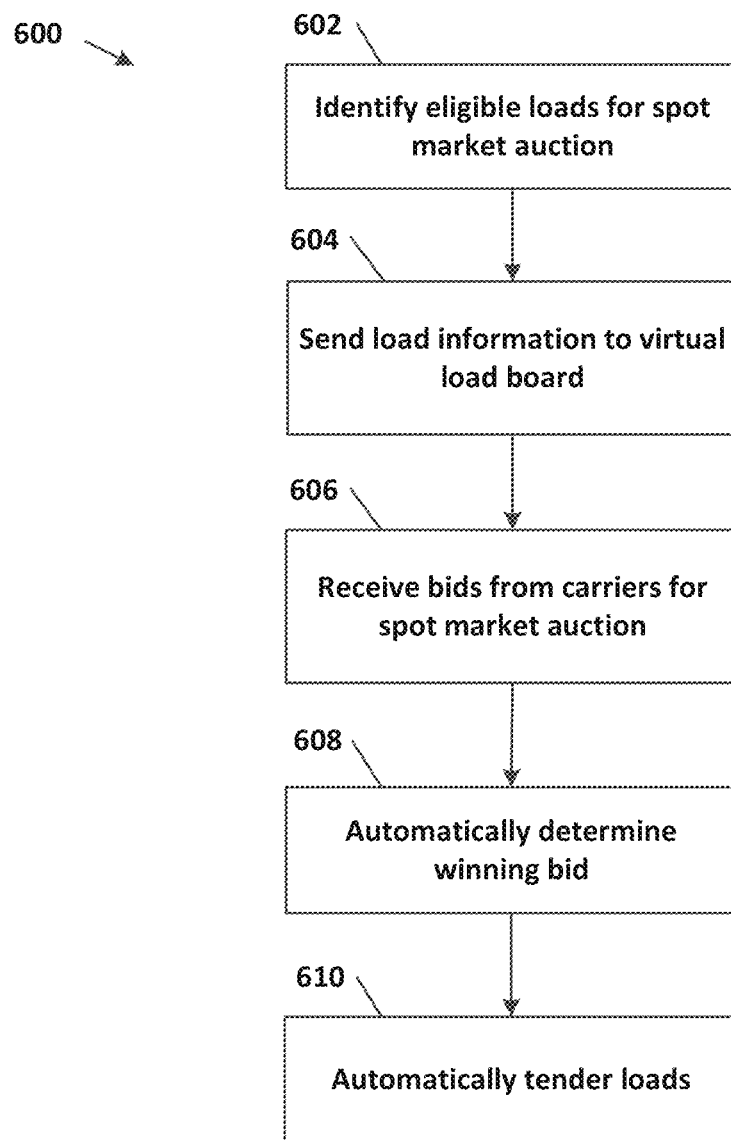
FIG. 6 illustrates a flow diagram of an example method of managing a load board.

Referring now to FIG. 6, a method 600 of managing a load board is described. In some embodiments, the method 600 can be performed by the supply chain management system 100 of FIG. 1, and more specifically the load board system 104.

At operation 602, loads eligible for spot market auctions are identified. In some embodiments, this is performed by a transportation management system such as the transportation management system 108 of FIG. 1. Loads eligible for spot market auctions may be determined based on one or more primary or contracted carriers declining to accept a given load (e.g., due to capacity constraints). This may occur automatically, for example, based on receipt of an Electronic Data Interchange (EDI) 990 (Response to a Load Tender) message received by the enterprise that declines the load. Accordingly, such loads may be designated as available for bid by non-contracted and contracted carriers. In some instances, and as made advantageous by the present disclosure, loads may be designated for spot market auctions based on a belief by an enterprise that an auction price for a given load may be lower than a contracted price, and that contracted load quotas (e.g., a predetermined number of loads agreed to be provided to a given carrier at the contracted rate within a given month/week/year) will otherwise be met or have been met. In accordance with the present disclosure, by utilizing the load board system described herein, an enterprise may be better able to track load prices and predict future load prices that are paid at auction, so the enterprise may more intelligently select whether to provide a load to a contracted carrier or to make the load eligible for a spot market option.

At operation 604, information about the eligible loads is uploaded to a virtual load board. The load board could be accessible by carriers and retailers through the API 130 and information about available loads could be viewed using the GUI 132.

At operation 606, bids are received from carriers for the spot market auctions. Bids can be communicated through the API 130.

At operation 608, the winning bids are automatically determined for each load. In some embodiments, the automated auction manager 134 of FIG. 1 determines the winners. In some embodiments, winning bids are accepted based on one or more rules that are predefined by the enterprise. In some instances, a rule may indicate that a particular carrier is ineligible to bid on a load, and so is disqualified from having a winning bid for that load. This may be due to the carrier being a contracted carrier for the given load and the carrier having previously declined to accept the load at the contracted rate. Accordingly, a situation where a carrier can decline a load at a contracted rate to attempt to obtain a higher price for the same load may be avoided.

At operation 610, loads are automatically tendered to the winning bidder. In some embodiments, the automated auction manager 134 communicates the winning bid information to the transportation management system 108 to issue the load tender.

In addition to the above, regardless of whether a load is tendered to a contracted carrier or to a carrier holding a winning bid, the price of the load, type of agreement (contract or bid), carrier, and load details (time, date, load size, other parameters) are captured to allow the enterprise to perform further analysis and predict future prices for similarly-situated loads.

Figure 7:
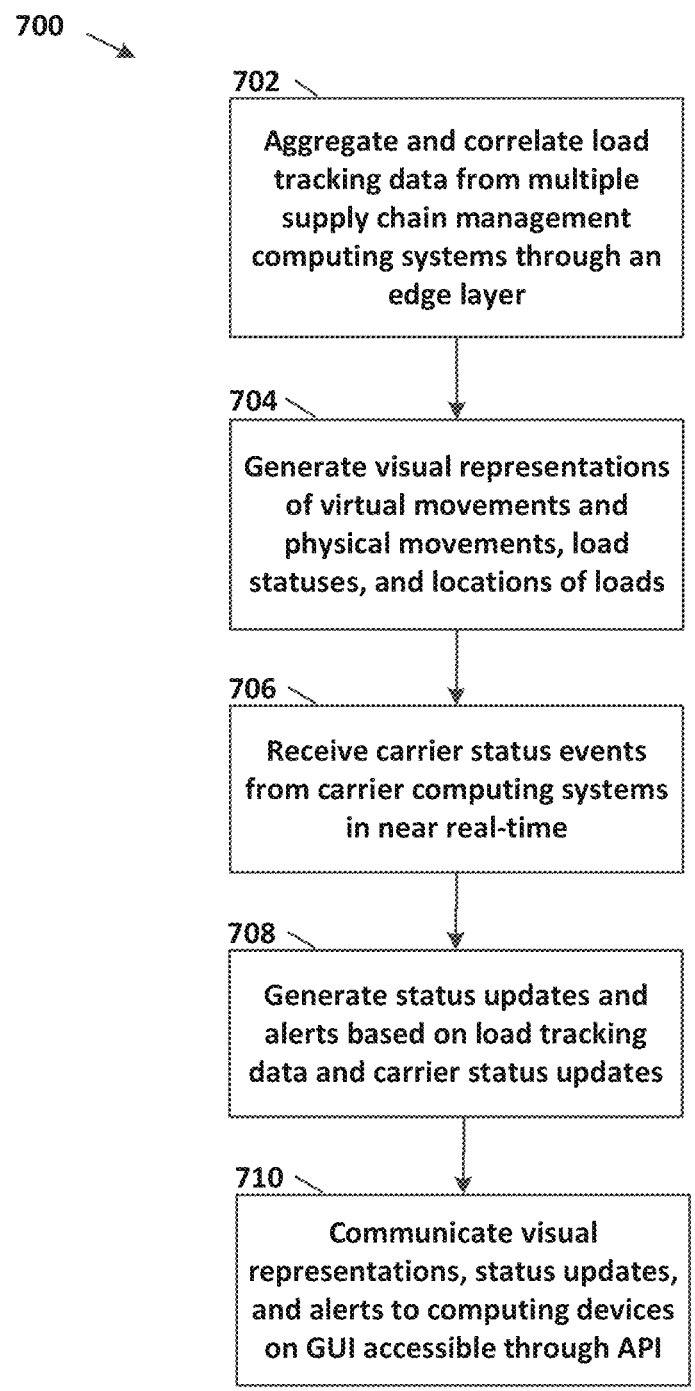
FIG. 7 illustrates a flow diagram of an example method of tracking loads within a retail supply chain.

FIG. 7 illustrates a flow chart of an example method 700 of tracking loads within a retail supply chain. In some embodiments, the method 700 could be implemented by the load tracking system 102 of FIG. 1.

At operation 702, load tracking data is aggregated and correlated from multiple supply chain management computing systems through an edge layer. In some embodiments, this operation is performed by the data aggregator 124 of FIG. 1 which receives information from the warehouse management system 106, the transportation management system 108, the movement ID service 128, the NTA 138, and the VRS 140. Such load tracking data may be received at the various systems due to those systems being configured to receive various types of Electronic Data Interchange (EDI) events and/or other status updates. For example, an EDI 204 message (Motor Carrier Load Tender) message may be issued by a transportation management system 108 to a carrier, and the EDI 990 message previously described may be returned to that system, either accepting or rejecting the load. The transportation management system 108 may then transfer an identifier of that load to the automated auction manager 134 for auction of the load. An accepted load may result in communication of an EDI 211 (Bill of Lading) or EDI 212 (Trailer Manifest) message.

At operation 704, visual representations are generated of virtual movements and physical movements of loads within the supply chain. Load statuses and locations are also included in the visual representations. In some embodiments, the representations are provided as tables of information that can be queried for particular loads, trailers, or locations.

At operation 706, carrier status events are received from carrier computing systems in near real-time. Periodic messages regarding various statuses or locations of the load may also be received at the load tracking system 102 and/or transportation management system 108 from the carrier via an EDI 214 (Transportation Carrier Shipment Status Message) message. Status events can include loading, trailer close, in transit (with specific location, if available), arrival at destination, and unloaded. Carrier status events can be communicated to the load tracking system directly through an API or indirectly through communications with the transportation management system 108.

At operation 708, status updates and alerts are generated based on the load tracking data and carrier status updates that are received. Alerts can be automatically generated when exceptions occur with shipments. Status updates are generated in response to information updates received from other supply chain management computing systems indicating a change in location or status of a load.

At operation 710, the visual representations, status updates, and alerts are communicated to computing devices. In some embodiments, the load tracking system 102 communicates status updates to an API that can be accessed by other computing systems within the supply chain management system 100 as well as carrier computing systems. The computing systems can access the visual representations through a graphical user interface (GUI) such as the GUI 126 of FIG. 1.

Figure 8:
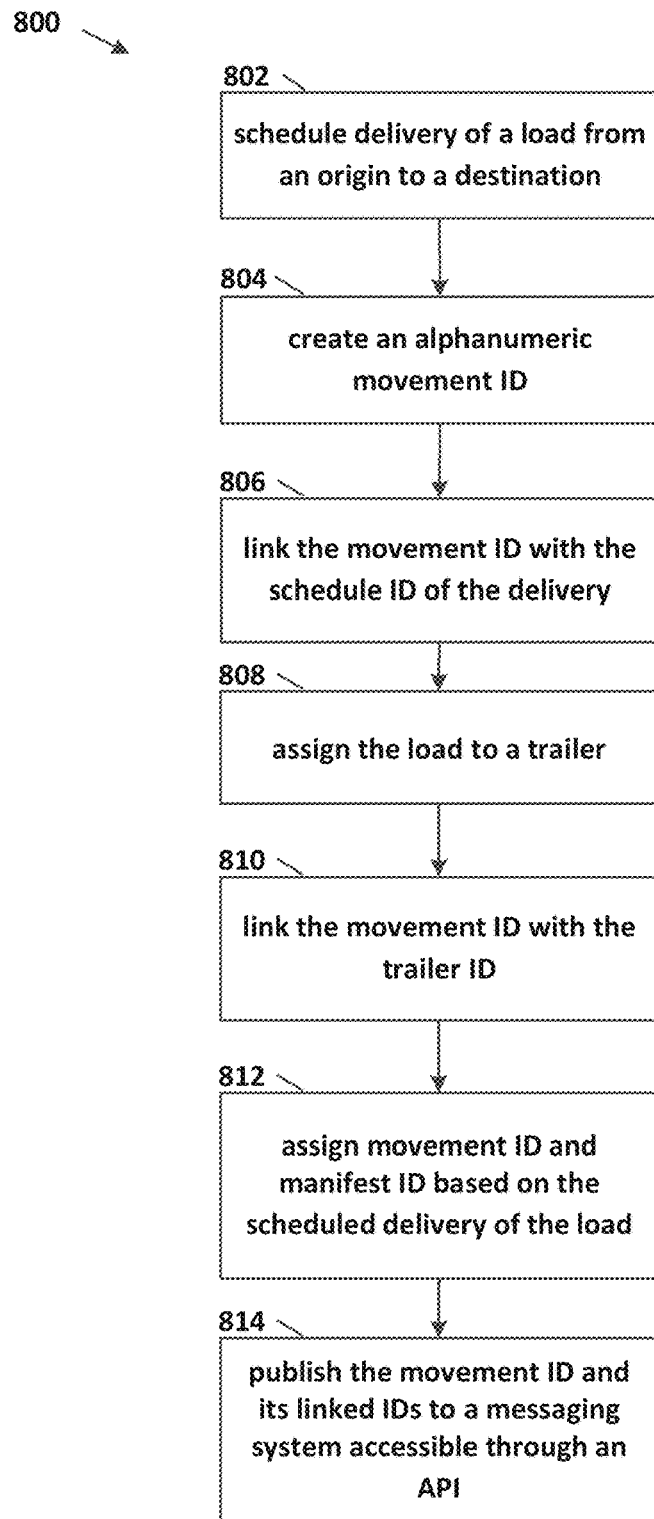
FIG. 8 illustrates a flow diagram of an example method of tracking load movements within a retail supply chain.

Referring now to FIG. 8, a method 800 of tracking movements of loads within a supply chain is described. In some embodiments, the movement ID service 128 performs many of the operations in the method 800.

At operation 802, delivery of a load from an origin to a destination is scheduled. A schedule ID is generated for the delivery.

At operation 804, movement ID is created for the delivery. The movement ID is an alphanumeric ID that is unique to each load movement. The movement ID can be generated at the time movement of a load is scheduled, e.g., at the time the schedule ID is generated, or even prior to generation of the schedule ID. The movement ID is communicated to a Kafka topic so it can be accessed by other systems through an API.

At operation 806, the movement ID is linked to the schedule ID. A systematic data join between the movement ID and schedule ID is created and saved to a data structure. The linked information can be communicated to the Kafka topic.

At operation 808, the load manifest is assigned to a trailer for delivery. The trailer ID is determined as well as a delivery estimate.

At operation 810, the movement ID is linked with the manifest and trailer ID. In some embodiments, a load ID, carrier name, and standard carrier alpha code is also linked to the movement ID.

At operation 812, a manifest ID and movement ID are assigned based on the scheduled delivery. In some embodiments, the manifest ID could be an OLE ship number (OSN) or a distribution center invoice (DCI). The manifest ID is assigned based on the next available NTA schedule. The manifest ID identifies a particular load including a collection of items that are to be transported between a distribution center, or warehouse, and another location, such as a retail location.

At operation 814, the movement ID and its linked IDs (schedule ID, trailer ID, manifest ID, etc.) are published to a messaging system accessible through an API. In some embodiments, the messaging system is a Kafka topic. The API can be used by carrier, vendor, and retailer computing devices to access information linked with the movement identifier.

FIG. 9 illustrates an example view of the GUI 126 for the load tracking system 102 of FIG. 1. A header 902 includes options for "Home," "Load Board," and "Load Tracking." Selecting the "Load Board" option would bring the display to a view of a load board, while the current view is that of "Load Tracking." A selection menu 904 provides options to filter the loads.

A series of entries 906 describing loads are displayed in a table. A box selector 910 is provided to select one or more of the entries 906. The table includes columns to describe "Load ID" 912, "Load Date" 914, "Delivery Date" 916, "Status" 918, "Origin" 920, "Origin Address" 922, "Destination" 924, "Destination Address" 926, and "Weight" 928.

In use, as noted above, the GUI 126 may be presented by the enterprise as automatically including entries 906 that correspond to loads for which bids may be accepted. The entries 906 may be viewable by third party carriers who are granted access to the GUI, e.g., via a set of carrier-specific credentials issued by the enterprise. Through interaction with the GUI 126, the carriers may be awarded loads based on winning bids driven by rules governing each auction, as dictated by the load board system 104.

Movement Identifiers

Updates to the movement identifiers (movement IDs) are published to Kafka topics as they occur. In some embodiments, there is a landing table that receives the updates. An API provides access to the updates published to the Kafka topics. Pulls to the API can include inputs such as movement ID, manifest ID (DCI), or other transportation or warehouse related identifier.

The movement ID makes it so that an overall picture of the location of trailers and the loads of items within those trailers can be accessed easily and quickly. Previously, trailer and load information was not linked and so it could be difficult to ascertain which items were loaded onto which trailers. Often, to check on the status of a load or trailer, calls would have to be made to carriers.

Trailers are scheduled such that the orders contained within are expected to be unloaded in the order that they arrive at a destination. In other words, the so-called "oldest" trailers should be unloaded first so that the items within arrive when expected. However, existing systems did not have a good way to tie the trailer identity to the identity of the orders contained within. Thus, multiple trailers could be sitting in a yard waiting to be unloaded and employees at a node would not know which trailers to prioritize for unloading. This resulted in orders/items being unloaded out of sequence and items won't get to where they need to be when they need to be there. There was a need for virtual and physical movements of containers to be associated with a persisted unique identifier.

This system generates and maintains a container referred to as a movement ID for a movement within a supply chain. The movement ID captures a plurality of data fields, populates identifiers into those data fields as they become available throughout (or after) a carrier move. The movement ID acts to link physical and virtual systems of supply chain management so that middle mile and last mile movements can be monitored to ensure that items are arriving at their intended destinations on time. The movement ID can be utilized in conjunction with the load tracking system 102 to access updated and aggregated information about load movements through a supply chain from multiple different computing systems. A warehouse management system (WMS) is provided a unique identifier for each origin/destination pair that is matched to a trailer and manifest. Information is shared using Kafka topics and APIs so that it does not need to be replicated and stored in databases of other systems. This system provides a holistic view of a supply chain network at the granular level for inventory movements. Freight can be tracked so that stores and other nodes know when certain items will be arriving.

In some embodiments, the movement ID service 128 stores information in a data structure. In some embodiments, the data structure is a single database with two to three tables. These tables list the associations between movement IDs and identifiers used with other supply chain management systems. The primary table includes movement IDs and their associated manifest IDs. Associations made between movement IDs and manifest IDs cannot be changed once established. Another table lists movement IDs with corresponding NTA and transportation management (TM) information. There is also a table for recording dates and times. In some embodiments, there is also a separate table for transportation information. Transportation information can change so this table remains separate from those containing fixed relationships. Other data storage structures and arrangements could be used to store movement IDs and related information. As new or updated information becomes available, the movement ID service 128 stores the information with the pertinent movement ID in the data structure.

An example of a movement ID table is shown in FIG. 10. The table includes a movement ID, manifest ID, schedule ID, load ID, trailer number, carrier name, standard carrier alpha code (SCAC), origin T-number, and destination T-number. Depending on the systems utilized by a retail entity for supply chain management there may be more or less fields and the combination of tracked fields may differ.

In example embodiments, a new movement ID is created when a scheduled delivery is created in NTA. The schedule ID is tied to the movement ID in the table. However, the schedule ID could change later. Table B shows the fields for movement ID filled in with P05G22V and the schedule ID filled in with 2846 for a new entry.

After the transportation manager has completed optimizing the NTA schedule 2846, the load ID, carrier name, and SCAC are assigned to the movement ID and recorded in the table. In the example table C, the load ID is 16597036, the carrier name is FedEx, and the SCAC is XPOL.

Just before trailer close at a warehouse, the warehouse management system (WMS) 106 requests the movement ID via Kafka by sending a request message including an origin T-number, destination T-number, manifest ID, and trailer number. The movement ID service 128 assigns the manifest ID to the movement ID with the next available NTA schedule based on scheduled delivery date. The movement ID is published via Kafka for the WMS 106 to complete the trailer close process. In table D, the manifest ID is shown as 2985, the trailer number is 512, the origin t-number is 101, and the destination T-number is 89. The next scheduled delivery is whichever schedule ID that has not yet been assigned to a manifest ID. The movement ID and manifest ID are now locked and changes cannot be made. However, other fields may be updated as necessary, as is described below. Completed movement ID details are now published to Kafka and are accessible by other computing systems via the Kafka topic or API pulls.

Situations can arise where the warehouse requests a movement ID and there is not already a scheduled delivery between the origin and destination. FIG. 11 illustrates example movement ID tables showing one such situation. The WMS requests the movement ID via Kafka by sending an origin, destination, manifest ID, and trailer number. These are recorded as shown in table A.

If there are not any available schedules in NTA for the origin/destination (O/D) pair, a new movement ID will be created, as shown in table B. The movement ID is locked in with the manifest ID, but no NTA or TM data is tied to the movement ID at this point. The movement ID details are published via the Kafka topic and are available to be pulled via an API (for example, the Core API 204 of FIG. 2).

Generally, a newly scheduled delivery that is added to NTA 138 will trigger the creation of a new movement ID and link the new schedule ID with the movement ID. However, if the delivery schedule date falls before an existing NTA delivery schedule that is already tied to a movement ID and manifest ID, the system will make updates. An example of this situation is shown in FIG. 12. Table A shows four movement IDs and the accompanying details tied to those movement IDs.

The newly added NTA schedule ID will be inserted chronologically and overwrite the existing NTA schedule ID for that movement ID. In the example of Table B, schedule ID 2847 is added and overwrite schedule ID 2848.

The NTA schedule ID which was previously attached moves to the next movement ID with the manifest ID having the next trailer close date. This ensures proper chronology of schedule IDs and trailer closings in WMS without breaking the associations between movement ID and manifest IDs. Schedule ID updates continue to cascade to maintain the chronology of existing movement ID. In the example of Table C, schedule ID 2848 moves down to replace 2848, and 2849 moves down to replace 2851.

Once existing movement IDs are exhausted a new movement ID is created for the NTA schedule ID that was previously attached to the last one. In the example table D, schedule ID 2851 is matched with the new movement ID of P90L31L.

FIGS. 13A and 13B show an example situation of an NTA schedule ID being cancelled. Cancellation of an NTA schedule results in removing the schedule ID from the movement ID. Table A shows the schedule ID for movement ID G88T42E being removed.

The schedule ID is replaced with the next chronological schedule ID, based on delivery date. The example Table B shows schedule ID moving up to match with movement ID G88T42E, leaving movement ID P90L31L without a schedule ID.

The schedule IDs are moved up chronologically to fill in for movement IDs missing schedule IDs until all of the schedule IDs are updated to the most recent movement ID. This ensures proper chronology of both schedule IDs and trailer closings without breaking the associations between movement IDs and manifest IDs. In example Table C of FIG. 13B, the schedule ID 2852 is shown moving up to movement ID P90L31L from movement ID Y87X89Z.

Leftover movement IDs are deleted. In Table D, the leftover movement ID Y87X89Z is deleted.

In this example, all adds and cancels must be captured in NTA 138. Any adjustment in the physical world (actual trailer movement) that is not captured in NTA will cause data to be out of sync for that trailer as well as all trailers for the same Origin/Destination pair until an adjustment is made. For example, if an additional trailer gets filled and closed without a corresponding schedule being added as an adjustment in NTA, the manifest ID will simply attach to the next available NTA schedule and all subsequent matching will be off by one. Clear procedures and process discipline in NTA can help control these exception scenarios, but if process is not followed, adjustments will need to be made.

Errors can occur with the movement ID system can occur in various scenarios. These can include when additional physical trailers are added without adding a corresponding schedule ID in NTA. Skipping a scheduled delivery without cancelling the corresponding schedule ID in NTA will cause an error. Another situation can occur if the trailer closed and delivered to store, but the store does not accept the trailer and sends it back to the distribution center. This will only cause a problem if the original NTA schedule ID is not canceled and a new NTA schedule ID is added. If either the original schedule ID gets canceled in NTA, or the distribution center can deliver to the store without adding a new schedule ID, the net result will keep equal counts of NTA schedules to actual trailers and no further adjustments will be necessary.

The use of an edge layer and single user interface provides many advantages over other supply chain management systems. The edge layer aggregates information from multiple different systems that operate independently from one another with different data formats and identifiers. This aggregated information is presented with a single user interface, allowing for a user to access the information from multiple systems at one point. Thus, a user only needs to log into one system and make one query to determine the status of a load instead of logging into multiple systems and making multiple queries to access the same information. This provides efficiency, not just for the user but for the many computing systems associated with the supply chain management system. Fewer computing transactions are required to access the needed information.

The load board provides additional advantages in that many of the steps required to post a load to the secondary market are automated. Rules are established to automatically determine some loads that will be posted to the load board for bids. Other additional loads can be posted if it is determined that the expected bids are less expensive that contracted carrier rates. Historical secondary market rates are recorded and aggregated automatically and later accessed to inform this decision. This results in cost savings to a retailer without requiring additional effort to obtain the information. The automated load tendering process also reduces the number of interactions that a retailer has to make with the load board and with carriers. Further, fewer communications are required between the retailer and carrier to carry out the deliveries.

The movement ID acts to link physical and virtual systems of supply chain management so that middle mile and last mile movements can be monitored to ensure that items are arriving at their intended destinations on time. The movement ID can be used in conjunction with a load tracking system to provide a holistic view of a supply chain network at the granular level for inventory movements. The movement ID allows for location of items in transit or in a warehouse without importing all WMS records into a larger transportation management system. This is advantageous because synchronization problems between WMS and other transportation management systems can be avoided.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A computer-implemented method of tracking movements of loads of items within a retail supply chain, the method comprising:
    scheduling a delivery of a load of one or more items from an origin to a destination within the retail supply chain, the delivery having a schedule ID generated by a first computing system;
    establishing, at a movement ID service having a centralized data store, a record within the centralized data store, wherein a supply chain management computing system operates the movement ID service;
    items being determined using the movement ID and using at least one of: the linked schedule ID, trailer ID, manifest ID, and the automatically aggregated carrier status events linked thereto;
    receiving a query for information about a load movement at the unified GUI, the request comprising at least one of a movement ID, trailer ID, schedule ID, and manifest ID;
    accessing, via the API, the record corresponding to the at least one of a movement ID, trailer ID, schedule ID, and manifest ID in the record store of the movement ID service;
    retrieving the queried information from the record; and
    updating the visual representations presented on the unified GUI based on the queried information.

2. The computer-implemented method of claim 1, further comprising, before the trailer close event occurs:
    receiving a request through the API for a movement ID from a warehouse management computing system, the request comprising an origin t-number, a destination t-number, a manifest ID, and a trailer ID; and
    communicating the movement ID to the warehouse management computing system.

3. The computer-implemented method of claim 1, wherein the movement ID, trailer ID, and schedule ID are linked in the record saved in a table in the centralized data store.

4. The computer-implemented method of claim 1, wherein the query is for a warehouse management system (WMS) manifest and the query includes a transportation management (TM) trailer ID.

5. The computer-implemented method of claim 1, wherein the query is for a trailer location and the query includes a WMS manifest ID.

6. The computer-implemented method of claim 1, further comprising automatically generating and communicating an alert to a retail store notifying that a trailer containing a load to be delivered to the retail store is arriving within a predefined window of time.

7. The computer-implemented method of claim 1, further comprising receiving the movement identifier and linked identifiers via the messaging system at an enterprise inventory management application.

8. The computer-implemented method of claim 7, wherein generating the unified graphical user interface further comprises:
    displaying information from the manifest alongside information linked to the trailer ID to show the near-current location of the specific physical items shipped from a warehouse location during shipment by the third-party carrier.

9. The computer-implemented method of claim 8, wherein the information linked to the trailer ID includes a load manifest and a current location.

10. A supply chain management computing system comprising:
    a processor; and
    a memory communicatively coupled to the processor, the memory storing instructions which when executed by the processor, causes the supply chain management computing system to:
    schedule a delivery of a load of one or more items from an origin to a destination within the retail supply chain, the delivery having a schedule ID provided by a node transportation application (NTA), the schedule ID being received via an electronic data interchange message;
    establish, at a movement ID service, a record within a table in a centralized data store;
    creating, at the movement ID service, a movement identifier (ID) comprising a unique alphanumeric having at least 4 characters, the movement ID configured to join together shipment status information from a plurality of separate, heterogeneous supply chain management computing systems for movement of the load from the origin to the destination;
    storing the movement ID in the record;
    linking, at the movement ID service, the movement ID with the schedule ID of the delivery and storing the schedule ID in the record in response to receiving a first electronic data interchange message with the schedule ID from the first computing system;
    storing the schedule ID in the record;
    assigning the load to a trailer, the trailer having a trailer ID stored at a second computing system;
    linking, at the movement ID service, the trailer ID with the movement ID in the record;
    before a trailer close event occurs associated with the trailer, assigning, with a third computing system, a manifest ID based on the scheduled delivery of the load;
    linking, at the movement ID service, the manifest ID to the movement ID by the movement ID service receiving a third electronic data interchange message with the manifest ID sent from the third computing system and storing the manifest ID in the record;
    storing the manifest ID in the record;
    publishing the movement ID and linked schedule ID, trailer ID, and manifest ID to a messaging system, the messaging system being accessible by the plurality of separate, heterogeneous supply chain management computing systems through an application programming interface (API);
    automatically aggregating and linking carrier status events in real time for the load with the movement ID, the carrier status events including first mile movements, middle mile movements, and last mile movements, wherein the carrier status events are received via electronic data interchange messages sent from multiple different computing systems including at least one carrier status event is received from a third-party carrier;
    generating a unified graphical user interface (GUI) configured to communicate visual representations of near-current locations and virtual planned movements of specific physical items to a plurality of computing devices, wherein the near current locations of specific physical create, at the movement ID service, a movement identifier (ID) comprising a unique alphanumeric having at least 4 characters, the movement ID configured to join together shipment status information from a plurality of separate, heterogeneous supply chain management computing systems for movement of the load from the origin to the destination;

store the movement ID in the record;

link, at the movement ID service, the movement ID with the schedule ID in the record;

assign, using a transportation management (TM) system, the load to a trailer;

link, at the movement ID service, a trailer ID for the trailer with the movement ID in the record, the trailer ID being received via a second electronic data interchange message;

before a trailer close event associated with the trailer occurs at the origin, assign a manifest ID generated by a warehouse management system (WMS) to the movement ID based on the scheduled delivery, the manifest ID being received via a third electronic data interchange message;

link, at the movement ID service, the manifest ID to the movement ID in the record;

publish the movement ID and linked schedule ID, trailer ID, and manifest ID to a messaging system, the messaging system being accessible by the plurality of separate, heterogeneous supply chain management computing systems through an application programming interface (API);

automatically aggregate and link carrier status events in real time for the load with the movement ID, the carrier status events including first mile movements, middle mile movements, and last mile movements, wherein the carrier status events are received via electronic data interchange messages sent from multiple different computing systems including at least one carrier status event is received from a third-party carrier;

generate a unified graphical user interface (GUI) configured to communicate visual representations of a near-current locations and virtual planned movements of specific physical items to a plurality of computing devices, wherein the near current locations of specific physicals items being determined using the movement ID and using at least one of: the linked schedule ID, trailer ID, manifest ID, and the automatically aggregated carrier status events linked thereto;

receive a query for information about a load movement at the unified GUI, the request comprising at least one of a movement ID, trailer ID, schedule ID, and manifest ID;

access, via the API, the record corresponding to the at least one of a movement ID, trailer ID, schedule ID, and manifest ID in the record store of the movement ID service;

retrieve the queried information from the record; and update the visual representations presented on the unified GUI based on the queried information.

11. The system of claim 10, wherein the movement ID and manifest ID remain linked regardless of changes made to other information in the table.

12. The system of claim 10, wherein the table further includes fields for carrier name, standard carrier alpha code (SCAC), load ID, origin T-number, and destination T-number.

13. The system of claim 10, further comprising an application programming interface (API) accessible by other computing systems; the API providing access to the published movement ID and linked schedule ID, trailer ID, and manifest ID and providing access to the unified GUI.

14. A method of linking data from different retail supply chain management systems, the method comprising:

establishing, using a movement ID service operating on a supply chain management computing system, a record within a table stored at a centralized data store;

receiving, at the movement ID service, a first electronic data interchange message with a schedule ID, the schedule ID being generated by a node transportation application (NTA) to represent a scheduled delivery of a load of items from an origin to a destination on a delivery date;

generating, with the movement ID service, a movement ID to be associated with the schedule ID, the movement ID comprising a unique alphanumeric configured to join together shipment status information from a plurality of separate, heterogeneous supply chain management computing systems for movement of the load from the origin to the destination;

storing, with the movement ID service, the movement ID and schedule ID linked together in the record;

receiving, at the movement ID service, from a transportation management system, a second electronic data interchange message with a load ID, carrier name, and standard carrier alpha code (SCAC) for a planned trailer movement between the origin and the destination;

storing the load ID, carrier name, and SCAC linked with the movement ID and schedule ID in the record;

prior to trailer close at the origin, receiving, at the movement ID service, a third electronic data interchange message with a request from a warehouse management system (WMS) for a movement ID, the request including an origin identifier, a destination identifier, a manifest ID, and a trailer number;

storing the origin identifier, destination identifier, manifest ID, and trailer number linked with the movement ID, schedule ID, load ID, carrier name, and SCAC in the record;

sending, from the movement ID service, the movement ID to the WMS; and publishing the movement ID and linked schedule ID, load ID, carrier name, SCAC, origin identifier, destination identifier, manifest ID, and trailer number to a messaging system, the messaging system being accessible by the plurality of separate, heterogeneous supply chain management computing systems through an application programming interface (API);

automatically aggregating and linking carrier status events in real time for the load with the movement ID, the carrier status events including first mile movements, middle mile movements, and last mile movements, wherein the carrier status events are received via electronic data interchange messages sent from multiple different computing systems including at least one carrier status event is received from a third-party carrier;

generating a unified graphical user interface (GUI) configured to communicate visual representations of near-current locations and virtual planned movements of specific physical items to a plurality of computing devices, wherein the near current locations of specific physicals items being determined using the movement ID and using at least one of: the linked schedule ID, trailer ID, manifest ID, and the automatically aggregated carrier status events linked thereto;

receiving a query for information about a load movement at the unified GUI, the request comprising at least one of a movement ID, trailer ID, schedule ID, and manifest ID;

accessing, via the API, the record corresponding to the at least one of a movement ID, trailer ID, schedule ID, and manifest ID in the record store of the movement ID service;

retrieving the queried information from the record; and updating the visual representations presented on the unified GUI based on the queried information.

15. The method of claim 14, further comprising modifying, using the movement ID service, one or more of the schedule ID, load ID, carrier name, SCAC, origin identifier, destination identifier, and trailer number in the table in response to messages received at the computing system from one or more of the NTA, WMS, and transportation management system.

16. The method of claim 15, wherein the movement ID and manifest ID remain linked regardless of changes made to other information in the table.

17. The method of claim 14, further comprising receiving the movement ID and linked information via the messaging system at an enterprise inventory management application; and generating the unified GUI displaying information from the manifest alongside information linked to the trailer ID to show a near-current location of specific items shipped from a warehouse location during shipment by the third-party carrier.

18. The method of claim 17, wherein the information linked to the trailer ID includes a load manifest and current location.

* * * * *